United States Patent
McCoy et al.

(10) Patent No.: US 9,032,253 B2
(45) Date of Patent: May 12, 2015

(54) INTEGRATED TESTING SYSTEM UTILIZING A TEST SCRIPT AND A TEST ENVIRONMENT CREATED BASED ON THE SCRIPT

(75) Inventors: Daniel McCoy, St. Augustine, FL (US); Lynne Sommer, Jacksonville, FL (US); John McKenzie, Jacksonville, FL (US)

(73) Assignee: Bank of America Corporation, Charlotte, NC (US)

(*) Notice: Subject to any disclaimer, the term of this patent is extended or adjusted under 35 U.S.C. 154(b) by 414 days.

(21) Appl. No.: 13/206,236

(22) Filed: Aug. 9, 2011

(65) Prior Publication Data

US 2013/0042151 A1 Feb. 14, 2013

(51) Int. Cl.
*G06F 11/36* (2006.01)

(52) U.S. Cl.
CPC ........ *G06F 11/3688* (2013.01); *G06F 11/3684* (2013.01); *G06F 11/3696* (2013.01)

(58) Field of Classification Search
CPC . G06F 11/263; G06F 11/2635; G06F 11/368; G06F 11/3664; G06F 11/3688; G06F 11/3672
USPC .......................................... 714/25, 26, 27, 32
See application file for complete search history.

(56) References Cited

U.S. PATENT DOCUMENTS

| | | | | |
|---|---|---|---|---|
| 5,218,605 | A * | 6/1993 | Low et al. | 714/45 |
| 6,779,134 | B1 * | 8/2004 | Laviolette et al. | 714/38.12 |
| 7,664,989 | B2 * | 2/2010 | Joshi et al. | 714/38.14 |
| 7,774,757 | B1 * | 8/2010 | Awasthi et al. | 717/127 |
| 8,165,886 | B1 * | 4/2012 | Gagnon et al. | 704/275 |
| 2006/0097983 | A1 * | 5/2006 | Haggman et al. | 345/156 |
| 2007/0192101 | A1 * | 8/2007 | Braho et al. | 704/251 |
| 2010/0318847 | A1 * | 12/2010 | Beg et al. | 714/26 |

\* cited by examiner

*Primary Examiner* — Joseph Schell
(74) *Attorney, Agent, or Firm* — Banner & Witcoff, Ltd.; Michael A. Springs

(57) ABSTRACT

Systems, methods, apparatuses, and computer readable media for testing information technology systems and/or applications are provided. In some examples, data may be categorized as frequently used and stored at an information technology system testing system. One or more portions of the frequently used data may then be identified for use in testing an information technology system. The systems, methods, and the like may further include building a testing environment and receiving a test script. In some examples, one or more data types may be identified for use in testing the information technology system based on various project criteria, the received test script, and the like. In some examples, additional data types and data associated therewith may be identified as associated with the one or more identified data types based on a predefined relationship. This additional data may then be automatically included in the testing of the information technology system.

21 Claims, 6 Drawing Sheets

INTEGRATED TESTING SYSTEM UTILIZING A TEST SCRIPT AND A TEST ENVIRONMENT CREATED BASED ON THE SCRIPT

BACKGROUND

New information technology applications and systems are being created each day. However, in addition to developing the new applications and systems, the applications should be adequately tested prior to being implemented to ensure any defects are identified, remedied, and the like. Testing is often performed by the team developing the application and may also be performed independently of that team. However, conventional testing methods can be slow and inefficient, particularly when dealing with large amounts of data. Accordingly, an integrated, stream-lined approach to testing new information technology systems and applications would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, systems, devices, computer readable media and methods for testing information technology systems and/or applications are provided. In some examples, data may be categorized as frequently used and stored at an information technology system testing system. One or more portions of the frequently used data may then be identified for use in testing an information technology system. The systems, methods, and the like may further include building a testing environment and receiving a test script. In some examples, one or more data types may be identified for use in testing the information technology system based on various project criteria, the received test script, and the like. In some examples, additional data types and data associated therewith may be identified as associated with the one or more identified data types based on a predefined relationship. This additional data may then be automatically included in the testing of the information technology system.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
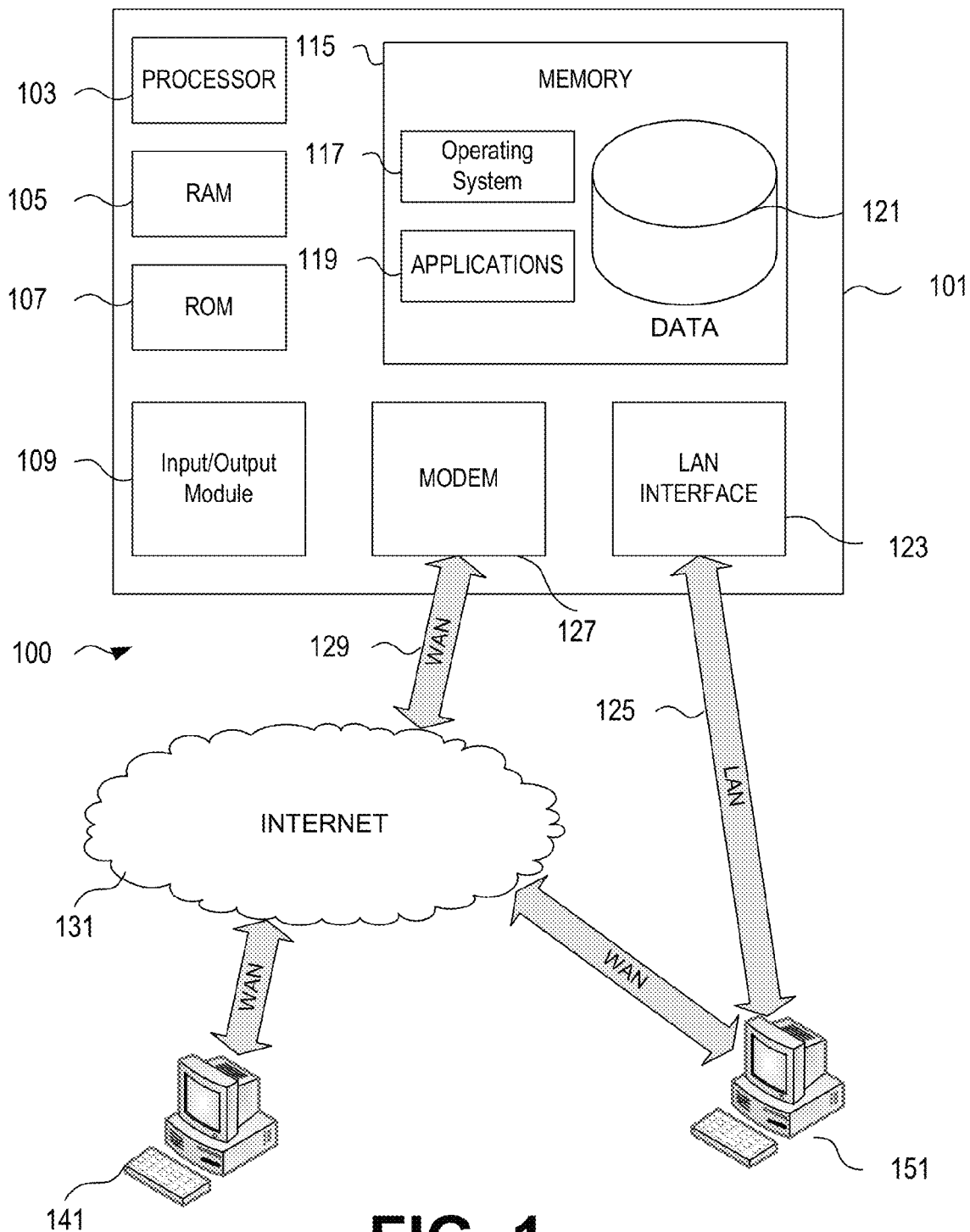
FIG. 1 illustrates an example operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computing device 101 may have a processor 103 for controlling overall operation of the device and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The computing device 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the server 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The above-described systems may be used in various businesses or corporate entities, such as financial institutions or other entities, to aid in testing one or more information technology systems. For example, the systems, methods, apparatuses, and computer-readable media described herein may include receiving test or project parameters and criteria and preparing to test the information technology system, building a test platform including receiving one or more test scripts and conducting the test. In some examples, the test(s) performed on the information technology system as described herein may be an additional test, performed independently of another test of the system. For instance, the creators of the information technology system may test the system. Once those tests are completed, the system may be tested again (by the same or a different entity), independently of the first test, using the systems, methods, apparatuses and computer-readable media described herein.

In some examples, the information technology testing system may provide efficiency improvements, such as identification of frequently used data, automatic identification of data that may be associated with the data being tested, and the like. These advantages will be discussed more fully below.

Further, although several examples used herein may include reference to a financial institution or projects associated with the financial institution, the systems, methods, and the like described herein may be used in a variety of industries (e.g., service and non-service industries), corporations, businesses, government agencies, universities, other types of organizations and the like. Nothing in the specification or figures should be viewed as limiting the invention to only use with banking or financial services related entities.

Figure 2:
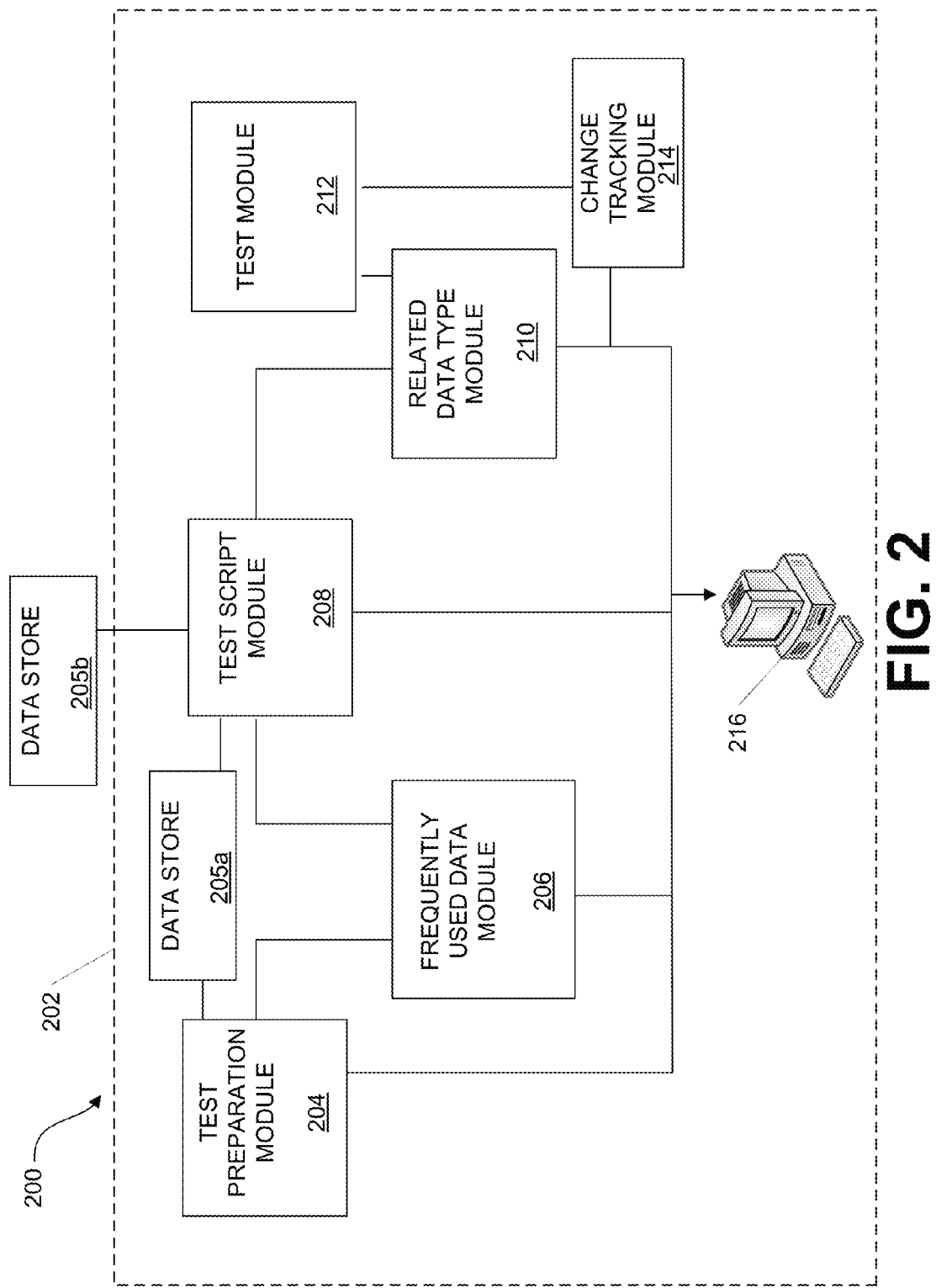
FIG. 2 illustrates an example system for testing an information technology system or application according to one or more aspects described herein.

FIG. 2 illustrates one information technology system testing system according to at least some examples described herein. The testing system 200 may be part of or associated with an entity 202, such as the entity implementing the system. The entity 202 may be a business, corporation, university or other educational institution, government agency, and the like. In some examples, the entity may be a financial institution, such as a bank. For simplicity, the testing system 200 will be described in terms of a financial institution. However, nothing in the specification or figures should be viewed as limiting any of the features or aspects described herein to only banks or banking related issues. In some examples, the testing system 200 may be external to or separate from the entity 202 (e.g., provided by or associated with a $3^{rd}$ party or outside vendor).

In some examples, the testing system 200 may be accessed via a network, such as the Internet. Additionally or alternatively, the testing system 200 may be accessed by systems internal to the entity 202, via a private network such as an intranet.

The testing system 200 may include a test preparation module 204. The test preparation module 204 may receive information associated with the project or system being tested. For instance, the test preparation module 204 may receive project criteria such as requirements or expectations for performance of the system being tested, functional requirements of the system being tested, timing of the test, expected completion dates, and the like. Additional project criteria may be received without departing from this invention.

The testing system 200 may further include a frequently used data module 206 (e.g., a database). The frequently used data module 206 may store data that, based on historical records, is often used in testing. In some arrangements, the data may be stored in the frequently used data module 206 upon determining that the data has been previously used a predetermined number of times, or has been used a number of times greater than a pre-determined threshold. The data may then be stored in the frequently used data module 206 and may be available for use. For instance, this frequently used data may be stored at the testing system 200 for a current test being run as well as future tests. In some examples, this may permit storage of commonly used information (e.g., customer data associated with customers of a bank, deposit data, and the like), in a single location. Since this data and these data types are frequently used, this may reduce or eliminate the need to copy over or store this data for each newly created test. Rather, the data can be stored in one location and accessed as needed. This may conserve data storage capacity and reduce costs associated with the testing system. In some examples, the frequently used data module 206 may store between 2 and 4 terabytes of data and, in some arrangements, may be refreshed on a periodic basis (e.g., monthly, every six weeks, and the like) in order to update data.

In some examples, the test preparation module 204 may identify a portion of the frequently used data stored in the frequently used data module 206 to be accessed for testing a particular information technology system. Identifying the data to be accessed may be performed, in some examples, automatically based on the received project criteria, parameters, and the like. For instance, the project or system for testing may include one or more particular criteria. In some arrangements, those criteria may be associated with one or more types of data or data generally stored in the frequently used data module 206. The data or data type may be identified based on this association (e.g., via a look-up table, and the like).

The testing system 200 may further include a test script module 208. The test script module may receive one or more test scripts for use in testing the information technology system. In some examples, the test script may be built by a user accessing the system, such as via user computer 216, or may be previously used script received by the test script module 208.

Various components of the testing system 200 may be connected to one or more data stores 205a, 205b. The data store may be internal to or associated with the entity 202 (e.g., customer data of a financial institution stored within the financial institution) such as data store 205a. In other examples, the data store may be external to or not associated with the entity 202, such as data store 205b. External data may, in some examples, include third party data, such as from a data warehouse, and the like. Although two data stores 205a, 205b are shown in FIG. 2, more or fewer data stores may be used without departing from the invention. For instance, in some examples, very large amounts of data may be used by the testing system 200. Accordingly, multiple different data stores may be connected to the system in order to access all data desired for conducting testing on various information technology systems.

In some examples, one or more data types may be identified by the test script module 208 for use in testing an information technology system. The data types may be automatically identified based on project criteria received by the test preparation module 204 or based on one or more parameters of a test script received by the test script module 208. Data corresponding to the identified data types may be retrieved from the data stores 205a, 205b for use in testing the information technology system. In some examples, the data may be retrieved and forwarded to test module 212.

The testing system 200 may also include a related data type module 210. The related data type module 210 may identify one or more data types related to the data types identified by the test script module 208 that may be useful in testing the information technology system. For instance, the data types identified by the test script module 208 may be associated with (e.g., in a look-up table, and the like) with other data types. Identification of the data types by the test script module 208 may prompt the related data type module 210 to search for additional data types associated with the identified data types and automatically identify the additional data types. In some examples, the relationships between data types may be predefined and identification of additional data types may include automatically retrieving data of the additional data types and, in some examples, transmitting the data to the test module 212.

Additionally or alternatively, the related data type module 210 may identify data types that may have a potential relationship with or association to the identified data types. In these examples, the data associated with the additional data types might not be automatically retrieved but rather a user may be prompted with a notification that additional data types have been identified and may be retrieved. A user may receive this notification and respond via user computer 216. User computer 216 may include one or more computers (e.g., desktop computers, laptop computers, netbooks, computing terminals, and the like) such as computer 100 of FIG. 1, cell phone, smart phone, and the like.

As mentioned above, the testing system 200 may include a test module 212. The test module 212 may execute the one or more test scripts using the identified and retrieved data. The system 200 may further include a change tracking module 214. The change tracking module may monitor the testing process and may record any changes made during the test (e.g., data used, test script modifications, and the like). The changes may be stored and may be reviewed or may be used in creating historical records of system testing.

Figure 3:
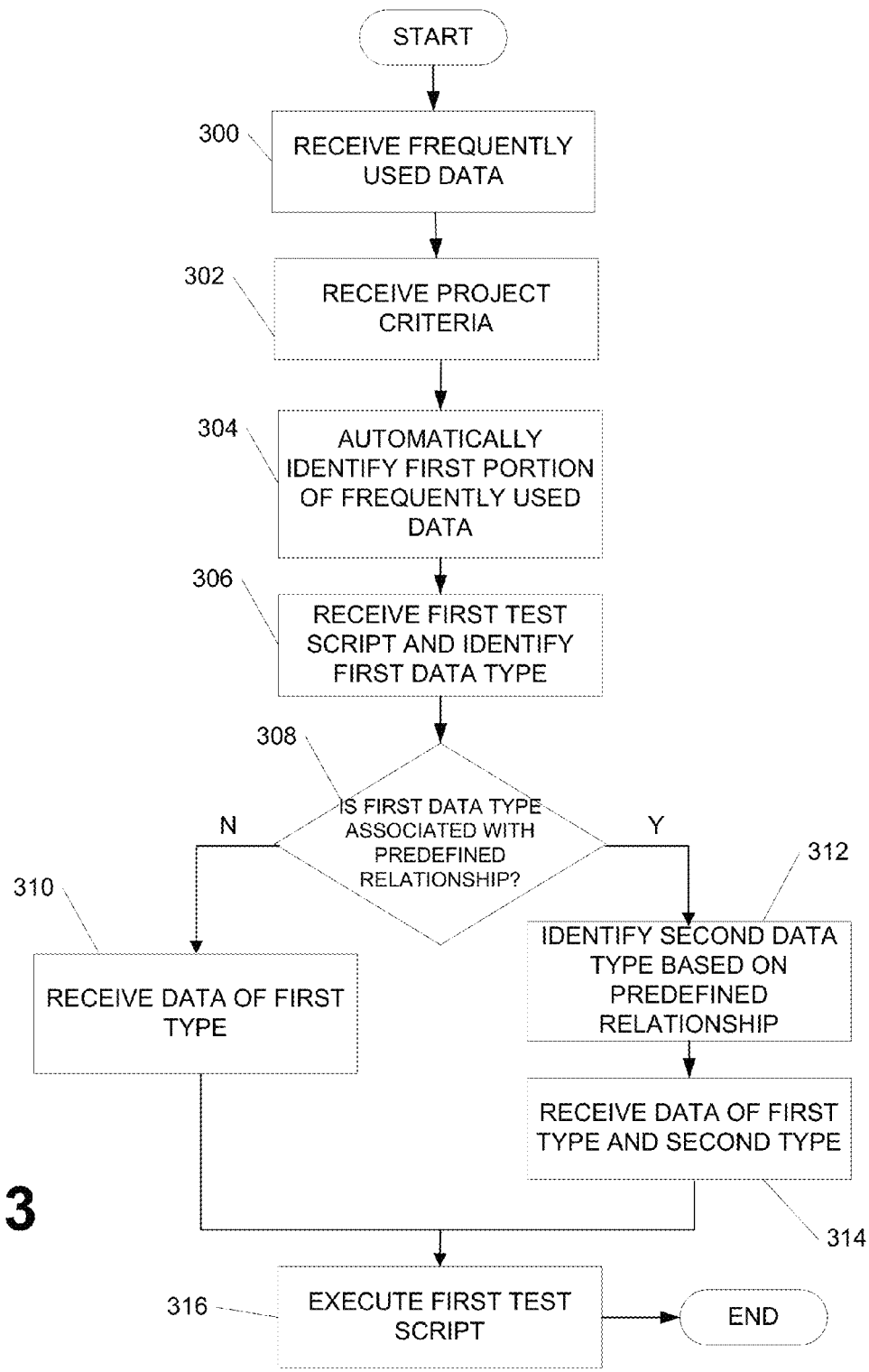
FIG. 3 illustrates one example method of testing an information technology system or application according to one or more aspects described herein.

FIG. 3 illustrates one example method of testing an information technology system according to one or more aspects described herein. In step 300, frequently used data is received (e.g., at testing system 200 in FIG. 2). The frequently used data may be received once at the system and remain stored within the system for later use as desired, in some arrangements. The frequently used data can be updated to include additional data meeting the criteria to be identified as frequently used, as discussed above. In step 302, project criteria are received. As discussed above, the project criteria may include the information technology system being tested, test parameters, functionality of the information technology system being tested, type of system being tested. In step 304, a portion of the received frequently used data may be identified for use in testing the information technology system based on the received project criteria. For instance, data may be identified based on, for example, the type of information technology system being tested, operating system of the information technology system, and the like. In some examples, identification of the portion of the frequently used data for use may include automatically retrieving the desired data.

In step 306, a first test script may be received and the testing environment may be built or created. For instance, building or creating the test environment may include various test parameters may be established and/or implemented, instructions for testing the system may be implemented, tables may be developed, data protection parameters may be put in place, and the like. The first test script may include one or more test processes or instructions for testing the information technology system. Additionally or alternatively, the first test script may identify a first data type for use with testing the information technology system. The first data type may include a domain or type of data, such as customer data, deposit data, loan data, and the like. The first data type may, in some examples, include multiple data types that may be tested together. In step 308 a determination is made as to whether the first data type is associated with a predefined relationship. For instance, a determination is made as to whether a predefined relationship between the first data type and another data type exists. If the first data type is not associated with a predefined relationship, data of the first type will be received in step 310 and the first test script may be executed in step 316.

If the first data type is associated with a predefined relationship in step 308, a second data type may be identified in step 312 that is associated with the first data type. In step 314, data of the first data type and the second data type is received and the first test script is run or executed with the data in step 316.

Figure 4:
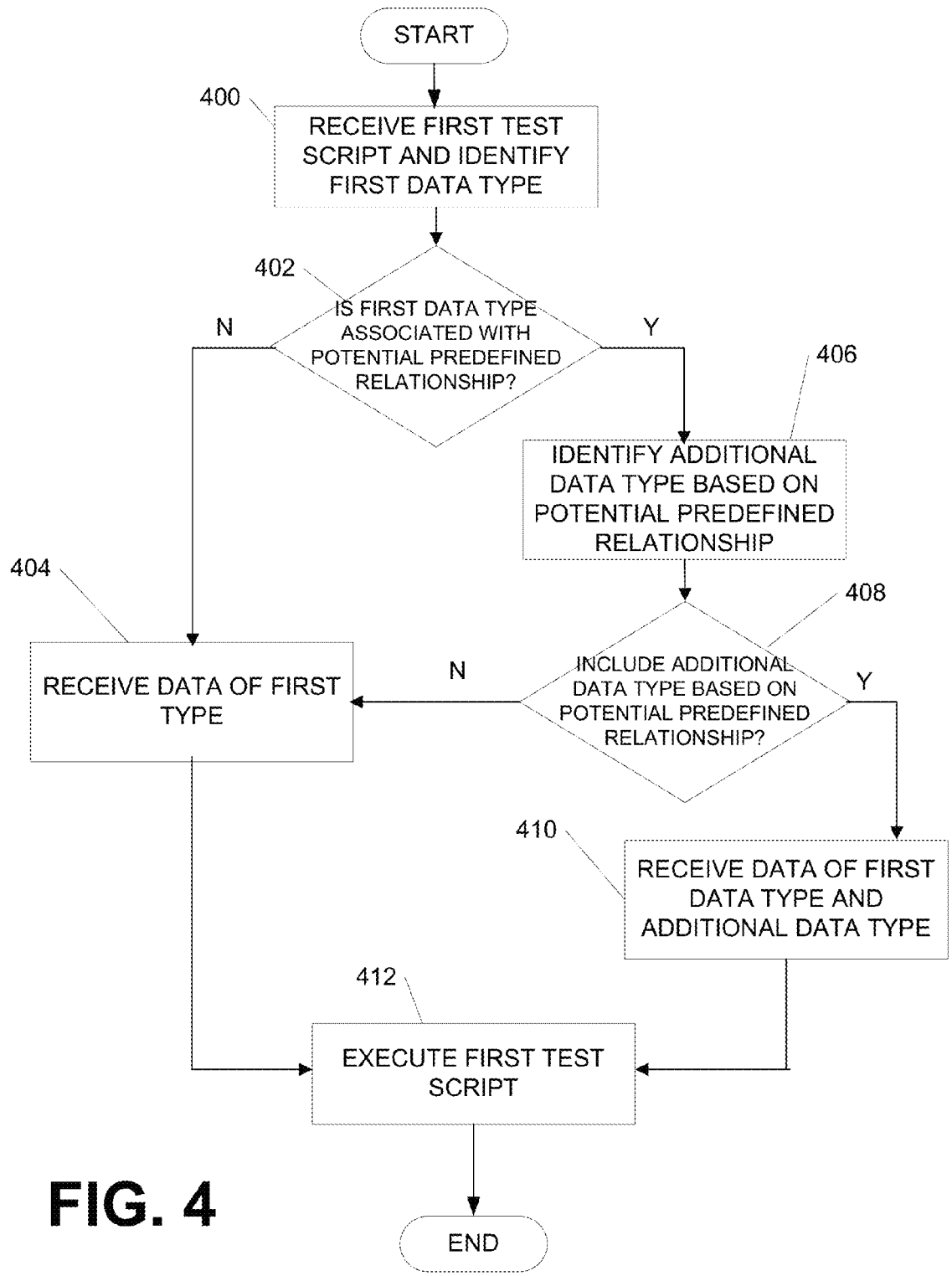
FIG. 4 illustrates another example method of testing an information technology system or application according to one or more aspects described herein.

FIG. 4 illustrates another example method of testing an information technology system according to one or more aspects described herein. In step 400, the first test script is received and the first data type is identified. As discussed above, a data type or domain may include various types of data and, in some examples, may include multiple different types of data that may be tested together. Step 400 may be similar to step 308 in FIG. 3 and may be preceded by steps similar to steps 300, 302, 306. In step 402, a determination is made as to whether the first data type is associated with a potential predefined relationship. For instance, in some examples, a search of one or more look-up tables may be conducted to determine whether the first data type has any predefined relationships. That is, the first data type may not be explicitly identified in a predefined relationship but may have potential connection to or association with one or more other data types that may be useful in testing the information technology system. If the first data type is not associated with a potential predefined relationship, data of the first type is received in step 404 and is used in executing the first test script in step 412.

If, in step 402, the first data type is associated with a potential predefined relationship, additional data types may be identified based on the first data type and the predefined relationship in step 406. In step 408, a determination is made as to whether the identified additional data type will be included in the testing process (i.e., whether data of the additional data type will be received and used in testing). In some examples, this determination may be made by receiving user input. In other examples, the determination may be made automatically based on one or more project criteria or parameters If the additional identified data type is not included, data of the first type is received in step 414 and the test is executed in step 412. If, in step 408, the additional identified data type is included, data of the first type and the additional identified data type are received in step 410 and the first test script is executed in step 412 using the data of the first type and the additional identified data type.

In some examples, modifications or adjustments may be made to the system being tested upon completion of a testing method (e.g., upon completion of execution of the first test script). The testing method (e.g., first test script) may then be re-run after the modifications have been made to assess performance of the system being tested. These testing loops may continue until all testing is complete or until performance of the system being tested reaches a satisfactory result.

Figure 5:
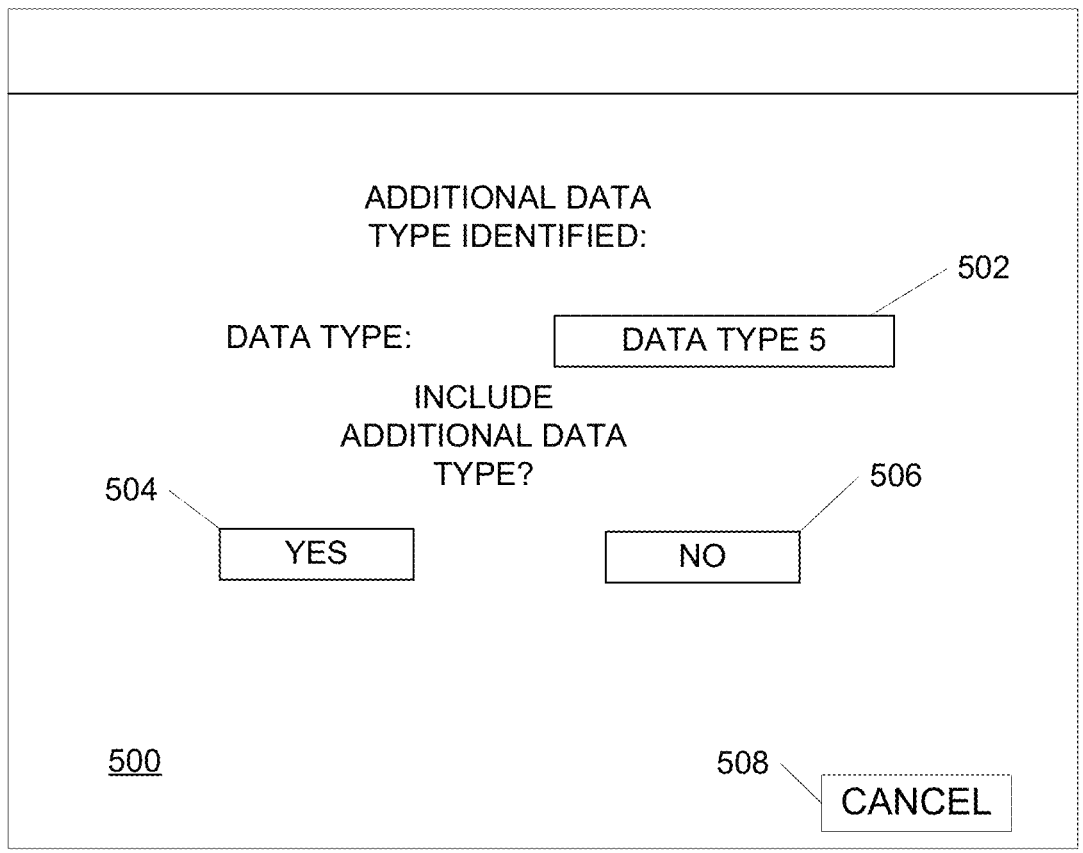
FIG. 5 illustrates one example user interface providing notification of an additional identified data type and providing an option to include the additional identified data type according to one or more aspects described herein.

FIG. 5 illustrates one example user interface including a notification that may be transmitted to a user to identify an additional data type identified based on a potential predefined relationship. The user interface 500 includes field 502 which provides an identification of the data type identified as potentially being associated with the first identified data type of the process. The user interface 500 may further include options for accepting or rejecting the identified additional data type. For instance, selection of "yes" option 504 may include the additional identified data type in running the test script and may cause the system to retrieve data of the additional identified type. Alternatively, selection of "no" option 506 may ignore the identified additional data type when executing the test script. User interface 500 may further include a "cancel" option 508 which may cancel any selections made or information identified.

Figure 6:
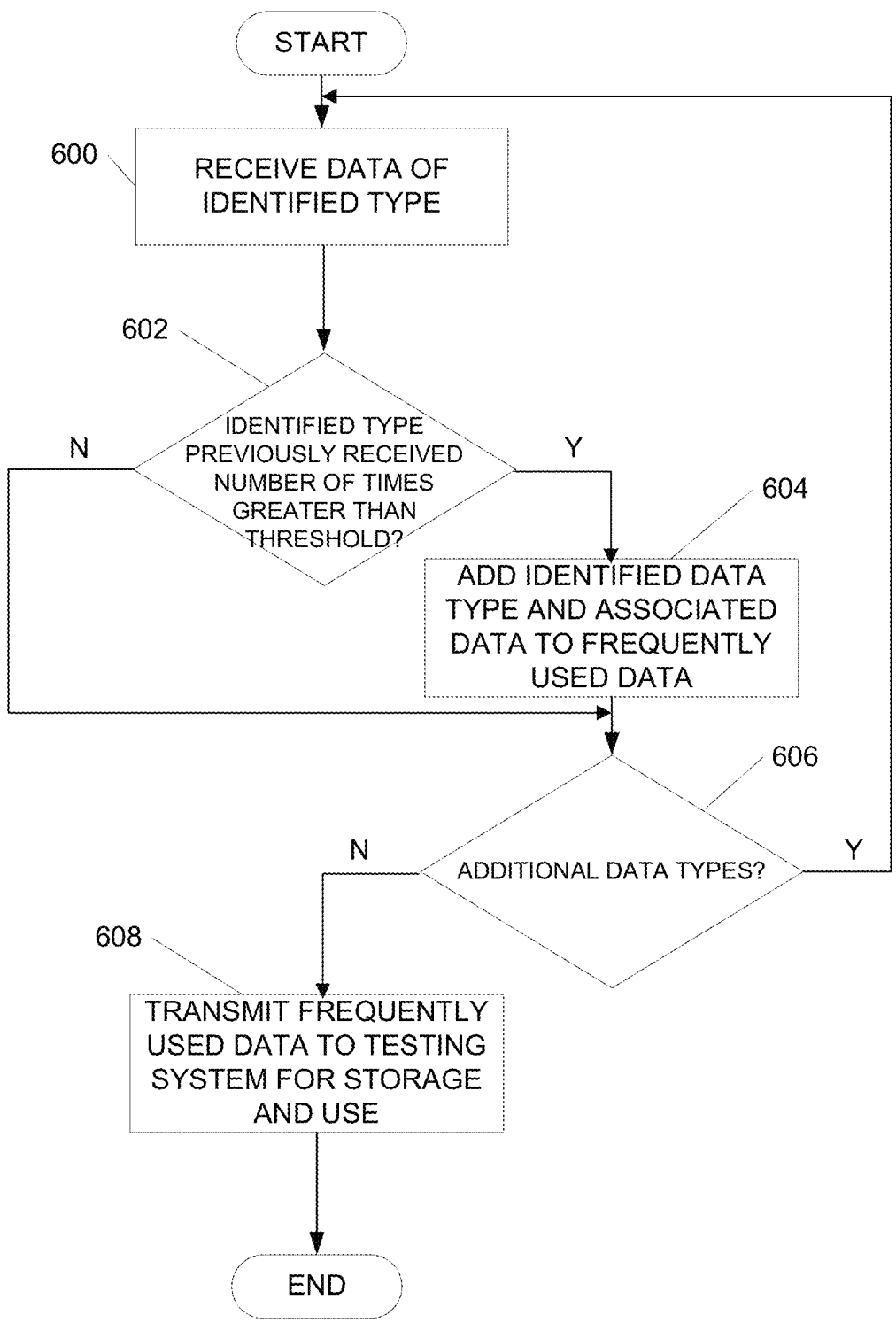
FIG. 6 illustrates one example method of identifying data that is frequently used according to one or more aspects described herein.

FIG. 6 illustrates one example method of identifying frequently used data. In step 600, data of an identified type is received. In step 602, a determination is made as to whether the data of the identified type has been received (such as by testing system 200) a number of times greater than a predetermined threshold. If the identified data type has not been received a number of times greater than the threshold, the process may proceed to step 606 to determine whether additional data types are available for evaluation. If so, the process may return to step 600 to receive data of an identified type.

If the data has been received a number of times greater than the threshold, the data of the identified type may be added to the frequently used data in step 604. In step 606, a determination is made as to whether additional data types are available for evaluation. If so, the process may return to step 600 to receive data of an identified type. If not, the frequently used data may be stored and, in some examples, transmitted to a testing system (such as system 200) for storage and/or use in testing.

The information technology system, method, apparatuses and computer-readable media described herein provide an integrated approach to testing information technology systems and may streamline testing information technology systems and may provide for more efficient testing methods. For instance, by providing access to frequently used data at the testing system, some data for testing may be automatically provided, without requiring copying of data, or storing the data in multiple locations. Further, automatically identifying data and data types that may be associated with other data types already included in the test plan may reduce the need for re-testing or reworking tests with the additional data. That is, data being used often is associated with or "touches" various other types of data. By automatically identifying the additional types of data that are associated, the proper data for testing is provided from the start, rather than later in the testing process. Because of the efficiency of the system and the integrated approach to testing described herein, the systems, methods, apparatuses, and computer-readable media described herein may be used to test systems using very large quantities of data. For instance, the testing systems, methods, and the like described herein may be used with various amounts of data. In some examples, the amount of data used during testing may be between 2 and 20 terabytes. Some arrangements may involve testing between 4 and 8 terabytes of data, while other arrangements (e.g., a major conversion) may involve 15 to 20 terabytes of data. The above-described ranges are merely some example amounts of data that may be used with the systems and methods described herein. Smaller or larger amounts of data may be tested without departing from the invention.

Further, the testing systems may include tracking capabilities that may identify changes to the test script, test parameters, project criteria, and the like and may store any changes made. The changes may be reviewed upon completion of the test or during the test to identify changes that may need to be made to the information technology system. This may provide the opportunity to identify problems, defects or issues with the information technology system while it is still in the development process, rather than in a post-production, in-use situation. In addition, the status of the testing being performed may also be tracked and, in some examples, the status information may be available for viewing, such as by various team members, the development team associated with the information technology system being tested, and the like.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. An apparatus, comprising:
   at least one processor; and
   memory operatively coupled to the processor and storing computer readable instructions that, when executed, cause the apparatus to:
   receive first frequently used data;
   receive project system criteria, wherein the project system criteria include criteria associated with testing an information technology system associated with a project;
   automatically identify and retrieve, from the received first frequently used data, a first portion of the first frequently used data associated with the project system criteria and configured to be used in testing the information technology system, wherein the first portion of the first frequently used data is identified based on information including at least one of the type of information technology system being tested and an operating system of the information technology system;

receive a first test script associated with the information technology system, the first test script including a first data type for use in testing the information technology system and including one or more instructions for testing the information technology system, wherein the first data type includes customer data, deposit data, and loan data;

create, based on the first test script, a testing environment for testing the information technology system, wherein the creation of the testing environment includes establishing and implementing instructions for testing the information technology system based on the first test script, developing tables based on the first test script, and establishing data protection parameters based on the first test script;

automatically identify, based on the received first test script and the first data type, a second data type for use in testing the information technology system, the identifying of the second data type being based on a predefined relationship between the first data type and the second data type;

receive data of the first data type and data of the second data type;

execute the first test script to test the information technology system using the first portion of the first frequently used data, the received data of the first data type and the received data of the second data type; and modify the information technology system upon execution of the first test script.

2. The apparatus of claim 1, wherein the memory includes additional instructions that, when executed, cause the apparatus to track alterations made after executing the first test script.

3. The apparatus of claim 1, wherein the memory includes additional instructions that, when executed, cause the apparatus to track a status of the execution of the computer readable instructions and communicate the status to a user.

4. The apparatus of claim 1, wherein the memory includes additional instructions that, when executed, cause the apparatus to automatically identify a third data type, the identifying of the third data type being based on a potential relationship between at least one of: the first data type and the third data type, and the second data type and the third data type.

5. The apparatus of claim 4, wherein the memory includes additional instructions that, when executed, cause the apparatus to prompt a user to include data of the third data type in executing the first test script.

6. The apparatus of claim 5, wherein the memory includes additional instructions that, when executed, cause the apparatus to:

responsive to receiving user input to include data of the third data type, receive data of the third data type; and responsive to receiving user input to not include the third data type, automatically ignore the potential relationship between the at least one of: the first data type and the third data type, and the second data type and the third data type.

7. The apparatus of claim 1, wherein the memory includes additional instructions that, when executed, cause the apparatus to perform a prior test of the information technology system prior to executing the first test script and independently of executing the first test script.

8. A method, comprising:

receiving, by an information technology system testing system, first frequently used data;

receiving, by the information technology system testing system, project system criteria, wherein the project system criteria include criteria associated with testing an information technology system associated with a project;

automatically identifying and retrieving, from the received first frequently used data, a first portion of the first frequently used data associated with the project system criteria and configured to be used in testing the information technology system, wherein the first portion of the first frequently used data is identified based on information including at least one of the type of information technology system being tested and an operating system of the information technology system;

receiving, by the information technology system testing system, a first test script associated with the information technology system, the first test script including a first data type for use in testing the information technology system and including one or more instructions for testing the information technology system, wherein the first data type includes customer data, deposit data, and loan data;

creating, based on the first test script, by the information technology system testing system, a testing environment for testing the information technology system, wherein the creation of the testing environment includes establishing and implementing instructions for testing the information technology system based on the first test script, developing tables based on the first test script, and establishing data protection parameters based on the first test script;

automatically identifying, based on the received first test script and the first data type, a second data type for use in testing the information technology system, the identifying of the second data type being based on a predefined relationship between the first data type and the second data type;

receiving, by the information technology system testing system, data of the first data type and data of the second data type;

executing the first test script to test the information technology system using the first portion of the first frequently used data, the received data of the first data type and the received data of the second data type; and modifying the information technology system upon execution of the first test script.

9. The method of claim 8, further including tracking alterations made after executing the first test script.

10. The method of claim 8, further including, tracking a status of the method and communicating the status to a user.

11. The method of claim 8, further including, automatically identifying, by the information technology system testing system, a third data type, the identifying of the third data type being based on a potential relationship between at least one of:

the first data type and the third data type, and the second data type and the third data type.

12. The method of claim 11, further including prompting a user to include data of the third data type in executing the first test script.

13. The method of claim 12, further comprising:

responsive to receiving user input to include data of the third data type, receiving data of the third data type; and responsive to receiving user input to not include the third data type, automatically ignoring the potential relationship between the at least one of: the first data type and the third data type, and the second data type and the third data type.

14. The method of claim 8, further including performing a prior test of the information technology system prior to executing the first test script and independently of executing the first test script.

15. One or more non-transitory computer readable media storing computer readable instructions that, when executed, cause an information technology test system to:
receive first frequently used data;
receive project system criteria, wherein the project system criteria include criteria associated with testing an information technology system associated with a project;
automatically identify and retrieve, from the received first frequently used data, a first portion of the first frequently used data associated with the project system criteria and configured to be used in testing the information technology system, wherein the first portion of the first frequently used data is identified based on information including at least one of the type of information technology system being tested and an operating system of the information technology system;
receive a first test script associated with the information technology system, the first test script including a first data type for use in testing the information technology system and including one or more instructions for testing the information technology system, wherein the first data type includes customer data, deposit data, and loan data;
create, based on the first test script, a testing environment for testing the information technology system, wherein the creation of the testing environment includes establishing and implementing instructions for testing the information technology system based on the first test script, developing tables based on the first test script, and establishing data protection parameters based on the first test script;
automatically identify, based on the received first test script and the first data type, a second data type for use in testing the information technology system, the identifying of the second data type being based on a predefined relationship between the first data type and the second data type;
receive data of the first data type and data of the second data type;
execute the first test script to test the information technology system using the first portion of the first frequently used data, the received data of the first data type and the received data of the second data type; and
modify the information technology system upon execution of the first test script.

16. The one or more non-transitory computer readable media of claim 15, further including instructions that, when executed, cause the information technology test system to track alterations made after executing the first test script.

17. The one or more non-transitory computer readable media of claim 15, further including instructions that, when executed, cause the information technology test system to track a status of the execution of the instructions and communicate the status to a user.

18. The one or more non-transitory computer readable media of claim 15, further including instructions that, when executed, cause the information technology test system to automatically identify a third data type, the identifying of the third data type being based on a potential relationship between at least one of: the first data type and the third data type, and the second data type and the third data type.

19. The one or more non-transitory computer readable media of claim 18, further including instructions that, when executed, cause the information technology test system to prompt a user to include data of the third data type in executing the first test script.

20. The one or more non-transitory computer readable media of claim 19, further including instructions that, when executed, cause the information technology system test system to:
responsive to receiving user input to include data of the third data type, receive data of the third data type; and
responsive to receiving user input to not include the third data type, automatically ignore the potential relationship between the at least one of: the first data type and the third data type, and the second data type and the third data type.

21. The one or more non-transitory computer readable media of claim 15, further including instructions that, when executed, cause the information technology test system to perform a prior test of the information technology system prior to executing the first test script and independently of executing the first test script.

* * * * *